Oct. 16, 1962  E. L. KERR ET AL  3,058,840
INDUCTION STRIP HEATING APPARATUS
Filed April 16, 1959  4 Sheets-Sheet 1
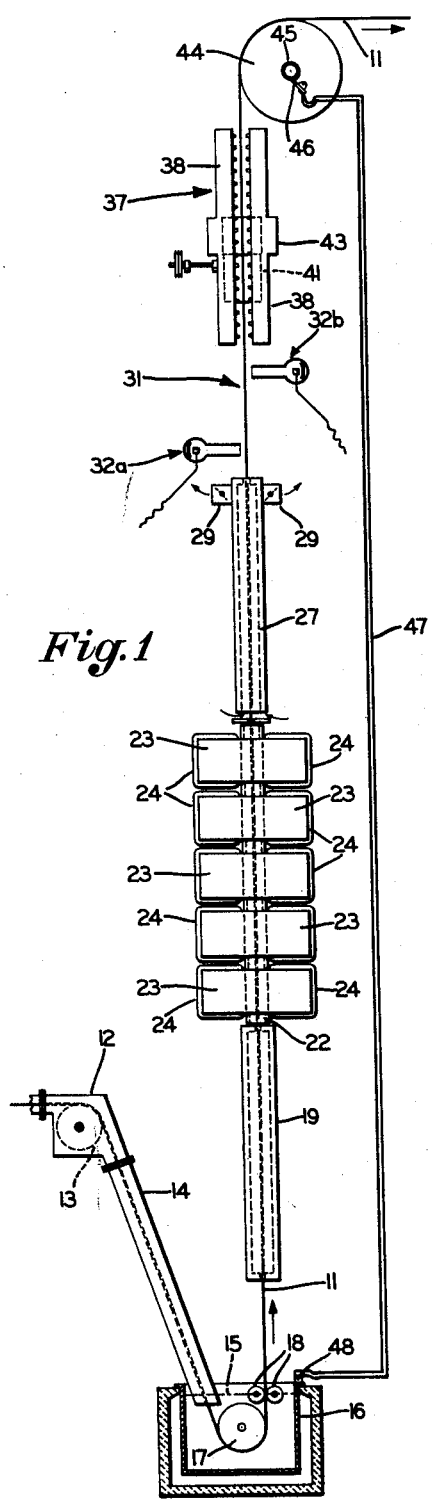
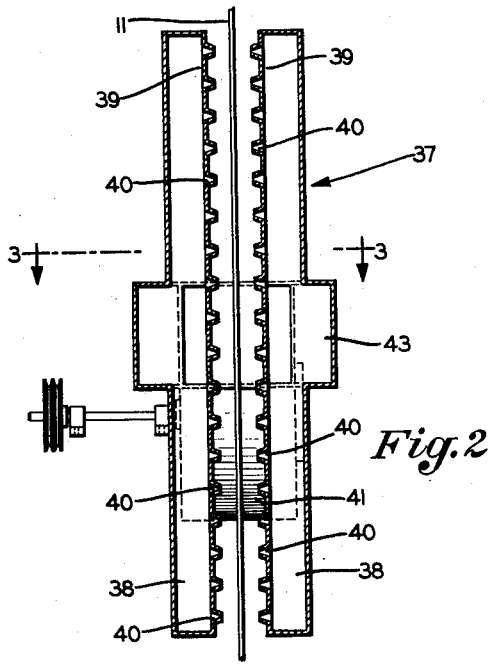
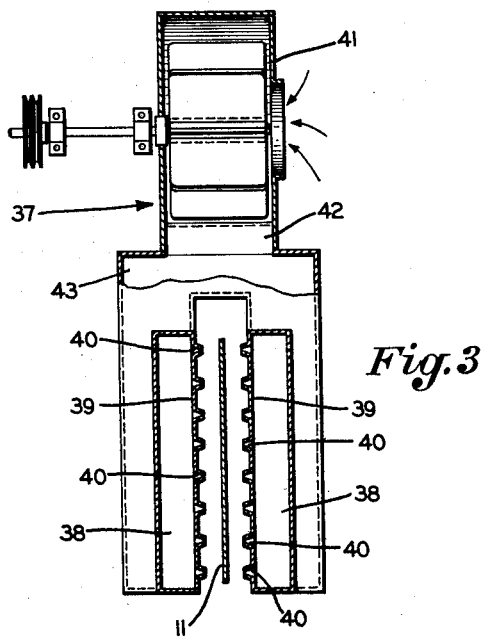
INVENTORS
Elmer L. Kerr a
Frank Robert Mathews n/a
Frease, Bishop, Johns & Schick
ATTORNEYS Oct. 16, 1962  E. L. KERR ET AL  3,058,840
INDUCTION STRIP HEATING APPARATUS
Filed April 16, 1959  4 Sheets-Sheet 2

INVENTORS
Elmer L. Kerr
Frank Robert Mathews

Frease, Bishop, Johns & Schick
ATTORNEYS

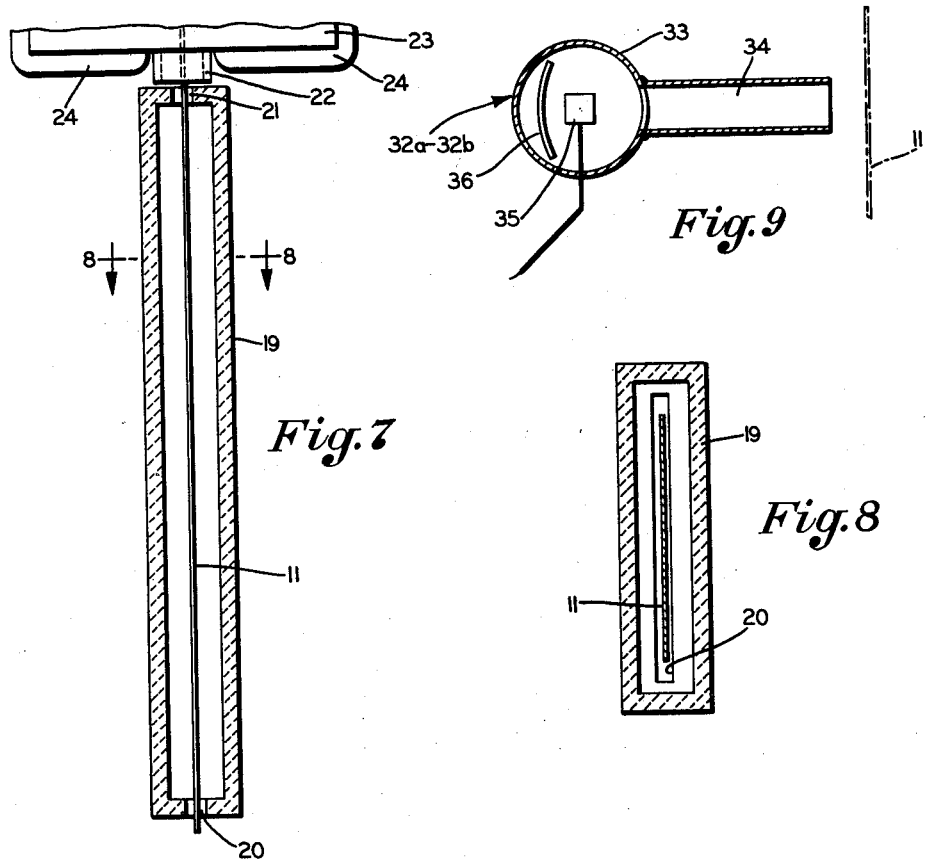

Oct. 16, 1962  E. L. KERR ET AL  3,058,840
INDUCTION STRIP HEATING APPARATUS
Filed April 16, 1959  4 Sheets-Sheet 4

INVENTORS
Elmer L. Kerr
Frank Robert Mathews
Frease, Bishop, Johns & Schick
ATTORNEYS

United States Patent Office 3,058,840
Patented Oct. 16, 1962

3,058,840
INDUCTION STRIP HEATING APPARATUS
Elmer L. Kerr, Damascus, and Frank Robert Mathews, Salem, Ohio, assignors to The Electric Furnace Company, Salem, Ohio, a corporation of Ohio
Filed Apr. 16, 1959, Ser. No. 806,935
17 Claims. (Cl. 117—93)

The invention relates to induction heating apparatus and more particularly to apparatus for induction heating of a continuously moving metal strip. Such apparatus is used in processes requiring the heating of a moving metal strip to a moderately elevated final temperature, such as 1000° F.

For example, such a heating operation may be used to convert a galvanized coating of zinc on steel strip to an alloyed coating wherein the entire coating consists of a zinc-iron alloy. This alloyed coating can be produced by a suitable temperature cycle, applied to strip after the normal coating operation.

In present galvanizing processes, heated steel strip with oxide-free surfaces maintained by contact with a high-hydrogen atmosphere is led through a bath of molten zinc. The strip leaves the bath in an upward direction carrying a surface film of molten zinc thereon.

In cooling, these films solidify producing the usual spangled finish. However, if the strip is heated from the zinc bath temperature, usually about 850° F., to 950° F. and held at the latter temperature for a short period of time, say about 5 seconds, sufficient iron from the strip dissolves in the molten zinc to form a layer of zinc-iron alloy.

No molten zinc remains after completion of this conversion. Neither the product, a steel strip coated with zinc-iron alloy, nor the temperature cycle by which it is produced, is the invention of applicants.

We have found that the necessary heating of the strip can be performed by passing an electric current through the strip in the direction of its length. For this purpose, we provide a contact roll over which the strip passes, usually above the zinc bath, and in any event at such a distance as to provide the necessary heating and holding time for the alloying process.

A cable, or bus bar, is connected at one end to the zinc bath, usually by attachment to the metal pot containing the molten zinc, and at the other end to a contact roll, over which the strip passes, by means of a suitable contact ring and brushes.

It is known that metal strips have been induction heated by passing them through a single induction device equivalent to a transformer. Such apparatus does not provide for applying adequate rates of heat input to the strip. We have found that in order to develop the voltage necessary for desired rates of production it is necessary to pass the strip successively through a plurality of such devices.

We have also found that where a strip is passed through an induction device such as a conventional transformer having a single coil upon one leg of the core, that there is a tendency to force the strip to one side. We have overcome this difficulty by providing coils upon opposite sides of the iron core of the transformer-like induction devices. Furthermore, we have found that it is desirable to provide means for controlling the temperature of the strip and holding it at desired temperature for a period of time.

We provide a plurality of induction devices, equivalent to transformers, disposed in inductive relation to the strip, between the bath and the contact roll. A circuit being established by the strip, the bath, the contact roll and the cable or bus bar, a current is caused to flow longitudinally of the strip against the resistance thereof, and to liberate heat.

By the induction devices or transformers and the contact roll, we provide means for maintaining an approximately uniform temperature during the holding period. Said means may also include cooling means, such as convection cooling means and forced cooling means, and control devices.

It is therefore an object of the invention to provide an apparatus for the induction heating of a moving strip, which overcomes the disadvantages and difficulties of prior practice.

Another object is to provide such an apparatus comprising a plurality of induction devices, equivalent to transformers, through which the moving metal strip is passed for controlling the voltage.

A further object of the invention is to provide an apparatus of this character in which each induction device is provided with coils on opposite legs of the iron core.

It is also an object of the invention to provide a device of the character referred to in which cooling means is provided above the induction means for holding the strip at desired temperature for a desired period of time.

Another object is to provide such an apparatus having spaced radiation detector elements so located as to respond to heat radiated from the strip at the entrance and exit of the control zone.

Still another object of the invention is to provide for controlling the voltage applied to the strip so as to complete the alloying process at a point between said radiation detector elements.

The above and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicants have contemplated applying the principle, being set forth in detail in the following description and illustrated in the accompanying drawings.

A preferred embodiment of the invention is illustrated in the accompanying drawings, in which:

FIG. 1 is a diagrammatic view of the apparatus for induction heating of the strip after it has passed through a continuous zinc-coating unit of the conventional type;

FIG. 2 is an enlarged longitudinal sectional view through the forced cooling means;

FIG. 3 is a section taken on the line 3—3, FIG. 2;

FIG. 7 is an enlarged longitudinal sectional view through the insulated chamber through which the strip passes after leaving the zinc pot;

FIG. 8 is a transverse section taken on the line 8—8, FIG. 7;

FIG. 9 is an enlarged sectional view through one of the radiation detector devices.

Reference is now made more particularly to the embodiment of the invention illustrated in the drawings, in which similar numerals refer to similar parts.

Figure 4:
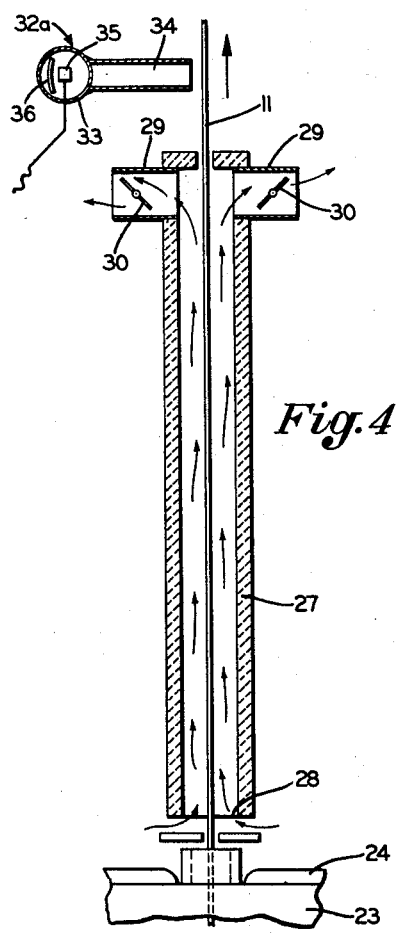
FIG. 4 is an enlarged longitudinal section through the convection cooling means, showing a fragmentary portion of the upper end of one of the induction heating devices and showing one of the radiation detector devices.

A continuous strip as indicated at 11, after passing through a conventional normalizing or annealing furnace (not shown) and after partial cooling in a non-oxidizing atmosphere, passes in horizontal direction into a turn roll housing 12. By the action of the roll 13 therein, the horizontal course of the strip is diverted to a downwardly inclined course.

The strip passes in this direction through the downwardly inclined closed passage 14, which extends from the roll housing 12 to a point below the zinc level 15, of molten zinc in the zinc pot 16. An idler roll 17 is located within the zinc pot, below the surface of the molten zinc, the strip passing around said roll and upwardly between the coating rolls 18 in the top of the zinc pot.

An elongated thermally insulated enclosure 19 is located above the zinc pot and provided at its lower and upper ends with restricted slots 20 and 21. The strip passes upwardly through the insulated chamber 19 and into an elongated thermally insulated enclosure 22, surrounded by a plurality of iron transformer cores 23.

Figure 5:
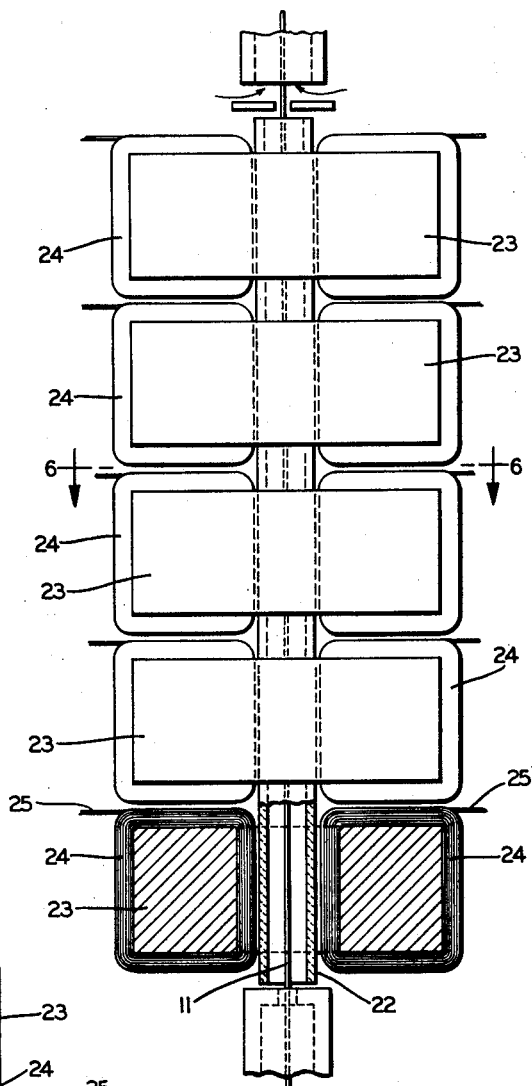
FIG. 5 is an enlarged side elevation, partly in section, of the induction devices.
Figure 6:
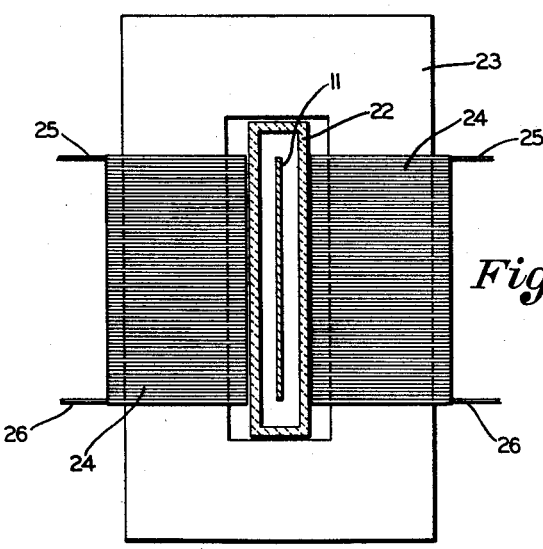
FIG. 6 is a transverse section taken on the line 6—6 FIG. 5.

Multi-turn primary induction coils 24 are wound around opposite sides of each core 23, as best shown in FIGS. 5 and 6, each coil having leads 25 and 26. These coils are energized by alternating current as will be hereinafter described.

The strip acts as a one-turn secondary of each transformer 23—24, whereby each transformer induces a voltage in the strip, approximately equal to the voltage per turn of the primary coils. As regards the strip, the induced voltages are in series. Thus, the total voltage induced is equal to the volts per turn in each transformer, multiplied by the number of the transformers.

After passing upwardly through the insulated enclosure 22, surrounded by the induction devices or transformers 23—24, the strip passes through the convection cooling chamber 27, having the open lower end 28 for inlet of air and discharge passes 29 at its upper end having air flow regulating means therein, such as the dampers 30, whereby the passage of air upward through the chamber 27 on opposite sides of the strip may be controlled.

A control zone, indicated generally at 31, which is shown unenclosed in the drawings, is located above the cooling chamber 27. A vertically spaced pair of radiation detector devices, indicated generally at 32a and 32b, are so located in this control zone as to respond to heat radiated from the strip at the entrance and exit respectively of the control zone.

Each control device comprises a housing 33 which encloses a thermoelectric element 35 and optical component 36 suitable for focusing infra-red radiation received through an opening at 34 upon said element.

Above the control zone 31 is located a final forced cooling means indicated generally at 37. This cooling means consists of the spaced plenum chambers 38 each having a wall 39 parallel to the strip. Nozzles 40 are provided in the walls 39 and more or less evenly spaced throughout the area of these walls for delivering air jets against the surfaces of the strip.

A blower 41 delivers air through the duct 42 and bustle duct 43 to the plenum chambers 38. This apparatus, which is one of several available types, is very effective and gives great cooling effect and moderate expenditure of horsepower.

After passing through the forced cooling apparatus 37, the strip then passes around the contact roll 44 and finally proceeds, preferably through further forced cooling means (not shown) to such conventional recoiling apparatus (not shown) as may be desired.

As above stated, the strip in passing through the transformers acts as a one-turn secondary of each transformer. The zinc bath acts as one terminal and the contact roll 44 as a second terminal. The roll 44 is made of material having good electrical conductivity, and has a slip ring 45 with which a brush 46 makes contact. A bus bar or cable 47 is connected to the brush 46 and to a lug 48 on the iron pot 16 containing the bath of molten metal.

In a commercial application of the invention which applicants have designed, the apparatus is generally as shown in the drawings. The total vertical distance from the surface of the zinc bath to the point of first contact of the strip 11 with the contact roll 44 is 60 feet. The control zone 31, between the radiation detectors 32, is 5 feet long and its entrance is 45 feet above the zinc bath. It is intended that formation of the zinc-iron alloy in the coating be completed in this control zone.

The desired capacity is such as to handle strip at a maximum capacity of 28,000 pounds per hour, maximum width 51 inches, maximum speed 160 feet per minute. This corresponds to 6,600 pounds/hour per foot width. The metal thickness which can be processed at 160 feet per minute is about .0168 inch (slightly heavier than #28, U.S. standard gauge).

Calculations will be based on heating the strip from a zinc bath temperature of 860° F. to a maximum of 950° F. in three-fourths of the distance from the bath to the entrance of the control zone, or in about 34 feet. Steel strip of .0168 inch thickness weighs .687 pound per square foot and requires about 9.25 B.t.u. per square foot, to heat from 860° F. to 950° F. This is equivalent to 2.7 watt-hours per square foot.

Since the time of travel through 34 feet at 160 feet per minute is .212 minute, or .00353 hour, the average power input per square foot of strip undergoing heating is 2.7/.00353, or 768 watts.

At a mean temperature of 905° F. we have determined the resistance of low carbon steel strip to be about 248 ohms per square mil foot. This corresponds to .00123 ohm per foot length, .0168 inch thick and 1 foot wide. The required current to develop 768 watts with this resistance is 790 amperes. It is then necessary, neglecting heat losses from the strip by radiation and convection, to produce a current flow of 790 amperes per foot width of strip. The required voltage for 34 feet length is 34×.00123×790, or 33 volts.

It is of course impossible to avoid loss from the strip surface during the heating operation. The emissivity of a bright film of molten zinc is reported to be about .08, referred to a perfect black body. Using this value, the calculated loss by radiation to 100° F. surroundings is about 465 B.t.u. per square foot surface hourly.

Estimated convection loss in 100° F. air is about 800 B.t.u. per square foot surface, hourly. The total is 1265 B.t.u., or 2530 B.t.u. per square foot of strip (2 sq. ft. surface). This corresponds to 740 watts or almost as much as the requirement for heating.

From experience we estimate that the insulated enclosures 19 and 22 can be constructed so as to reduce the loss to about one-third of the calculated open air loss, or to say 250 watts. This is 32.5% of the "useful" input, and the gross input must be 1.325 times the latter. The required current becomes 910 amperes, and the potential across 34 feet of strip, 38 volts.

We may assume that the strip in the remaining length of 26 feet has about the same average temperature as in the first 34 feet. The current flows through this portion of the strip also, and requires a potential of about 29 volts. Thus, the total potential is 63 volts. The input per foot strip width is 63×910, or 57,500 watts. For the maximum width of 4.25 feet, the total current is 3880 amperes, and the power developed is 245,000 watts.

For control purposes, we take advantage of the fact that when alloying of zinc and iron has been completed, producing a zinc-iron alloy coating, the emissivity increases from the original low value of .08 to a much larger value of perhaps as high as .75; almost a tenfold increase.

The response to the detector elements 32a and 32b to strip temperature depends greatly upon whether or not alloying has occurred when the lines-of-sight of the detectors are reached. If it has occurred, a stronger signal results. We use these detectors and instruments which they actuate to control the voltage applied to the strip so as to complete the alloying at some point between the detector elements 32a and 32b.

In operation, if the lower detector 32a delivers a signal higher than a pre-set value, the control reduces the voltage. If the signal from the second detector 32b is lower than a pre-set value, indicating that alloying is not completed, the voltage is increased.

Both instruments, which these detectors actuate, are arranged to change the voltage at a slow rate as long as the error exists. This may be termed a "floating" type control, and is shown in the wiring diagram in FIG. 10 which will be later described.

It is important to maintain the temperature conditions which have been stated, and especially to provide a period where temperature is maintained at about 950° F. without appreciably exceeding that value. The resistivity of low carbon steel increases fairly rapidly with temperature. This is useful in maintaining temperature uniformity across the strip, because if some region, such as the center of the strip, tends to reach a higher temperature than others, the resistance of such a longitudinal strip increases and tends to divert current to cooler portions.

However, when the longitudinal direction is considered, it is apparent that when full temperature has been reached at some point of travel, a high resistance then exists at such point, and for a given current flow, a considerable heating effect remains.

This condition exists in the foregoing example from a point 34 feet above the zinc bath and thence to the point where alloying is completed in central zone 14. It is now necessary to remove the excess heat which is liberated in what may be termed a "holding section" 11 feet long in the example, or slightly more than 4 seconds at the maximum speed of 160 feet per minute.

This may be the distance from the exit end of the insulated enclosure 22 extending through the transformers to the first radiation detector device 32a. However, the transformers could have been located at a lower level or in fact even combined with forced cooling apparatus of some type and located where the insulated enclosure 22 is shown in FIG. 1.

For the purpose of maintaining an approximately uniform temperature in the holding section, the convection cooling chamber 27 is provided in which natural convection cooling occurs, with the provision of means for adjustment such as the dampers 30. An adjustment is made such that by controlling the voltage applied to the strip, the point at which alloying is completed can be kept within the control zone 31.

The final forced cooling means 37 located above the control zone 31 has heretofore been described in detail. As hereinbefore described, we use a plurality of transformer-like induction elements 23—24. In the example above given, a total required potential of 63 volts was calculated. Since the calculations are approximate, some excess voltage should be provided, for example up to 75 volts maximum.

In transformer design the cross-sectional area of the core is in proportion to the volts per turn of primary winding. We have found it advisable to use a maximum of about 15 volts per turn. This calls for about 62.5 square inches cross-sectional area of core, using a good grade of electrical sheet. In the present case we may use about 8 inches by 8 inches as cross section dimensions, for each transformer core.

To allow room for the primary coils and for the strip passage enclosure, the core "window" needed is about 15 inches by 69 inches. The resulting core weight is approximately 3000 pounds.

To provide for 75 volts total potential at 15 volts per turn (15 volts per transformer in the strip) requires 5 transformers, the number shown in the drawings. To be sure, more core area could be used, with consequently higher voltage per turn. However, this is not economical because it increases the difficulty of cooling and also for geometrical reasons, a somewhat greater total weight of silicon-steel core material is necessary.

It is common practice to operate a given strip-heating furnace, such as the one preceding the galvanizing bath, at about a constant hourly rate in pounds per foot of strip width. Thus, for the example given, strip thicker than 0.168 inch should travel at such speed below 160 feet per minute, as to produce 6,600 pounds per hour per foot of width.

Obviously, the speed varies inversely as the thickness. Power input per foot width must remain substantially constant, but the decreased resistance of thicker strip requires the current per foot width to vary directly, and voltage inversely, as the square root of strip thickness. These facts will be obvious to one skilled in the art.

The use of radiation detector elements 32a and 32b in the control zone is a simple and satisfactory expedient. However, other apparatus can be used. For example, by special management of thermocouple, including insulating shielding and location very close to the strip, it is possible to obtain a temperature which is close enough to true strip temperature for most purposes. Temperature control instrumentation of conventional kinds can be used. Such control usually is preferable since in most cases the great change in surface properties, which follows the alloying of a zinc coating with the iron of the base strip, does not occur.

Figure 10:
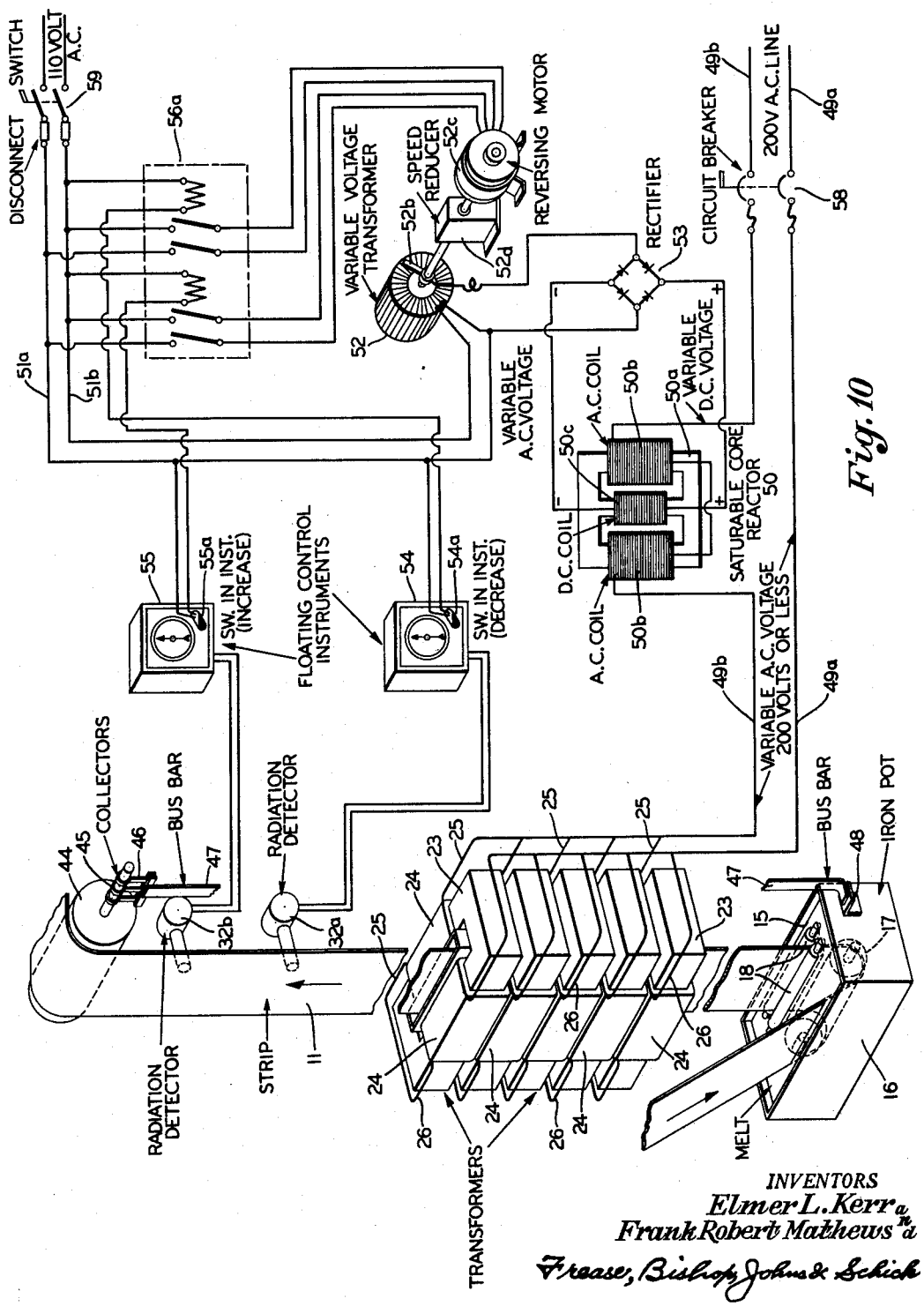
FIG. 10 is a wiring diagram of the control circuits.

In FIG. 10 is shown in diagrammatic form the control apparatus preferred when the invention is used for the production of alloyed zinc-coated strip. The diagram shows the transformer cores 23 and coils 24, used to induce potential differences in the strip 11. The coils 24 are connected to the power leads 49a and 49b.

A "saturable core reactor" assembly 50 is connected in series with the power lead 49a. This assembly consists of the core 50a, alternating current coils 50b, and the direct current coil 50c. The function of such saturable reactors is well known in the art of electric heating. The inter-action of the alternating current coils 50b and the core 50a produces an inductive reactance which opposes a part of the potential differences between lines 49a and 49b.

Thus the voltage available at the transformer coils 24 is less than the full line voltage. However, if a direct current is caused to flow through the coil 50c, the core 50a is partially saturated with unidirectional flux, and the inductive reactance is lowered. Thus, direct current flow through the coil 50c causes higher alternating current voltage to be imposed upon the transformer coils 24, to an extent depending on the value of the direct current. A substantially stepless modulation thus can be obtained.

The direct current source is derived from alternating current supply lines 51a, 51b, variable-voltage auto-transformer 52 and rectifier 53. The direct current voltage delivered by rectifier 53 depends upon the alternating current voltage from the transformer 52. This is adjusted by the position of the contact arm 52b which in turn is moved by reversing motor 52c operating through reduction gear feed 52d. The rate of change of adjustment is slow, so that floating type control can be used without danger of overcorrection.

Infra-red radiation from the strip 11 is focused upon the junctions of the thermocouples in the radiation detector devices 32a and 32b. This produces a thermoelectric voltage, dependent upon the amount of radiation reaching the thermocouples. By connecting the detector elements 32a and 32b to control instruments 54 and 55, and setting the instruments to act at suitable voltages, contacts 54a and 55a may be made to open and close at appropriate values of radiation received by the detector devices.

In the present case we adjust so that if the zinc-iron alloying has been completed, and the radiation emissivity therefore is high, at the area radiating to the lower detector device 32a, contact 54a closes. This energizes the motor contactor 56a and causes the motor 52c to change the adjustment of the variable transformer 52 so as to decrease its delivered voltage.

Thus the D.C. voltage to the coil 50c is decreased and the A.C. voltage to the transformer coils 24 is reduced. The heating effect on the strip 11 is reduced. The setting at the variable transformer 52 continues to be changed as long as a contact is maintained at 54a in the control instrument 54.

In similar fashion, the contact 55a is arranged to close if less heat is received by the upper radiation detector 32b than that which corresponds to the high emissivity of a zinc-iron alloy coating. This causes an increase in the voltage in the transformer coils 24 by a process corresponding to that just described, and increases the heating effect on the strip 11 at a slow rate, as long as the error exists. The usual control devices used in control circuits such as the circuit breaker 58 and disconnecting switch 59 are used in the circuit.

From the above it will be obvious that the induction strip heating apparatus disclosed provides means for induction heating of a continuously moving strip by passing the same through a plurality of transformers, each having coils on opposite sides of the strip so as to permit the strip to pass centrally therethrough, to heat the strip to a desired temperature, and with means for controlling the temperature of the strip and holding the same at the desired temperature for a required period of time.

Where the apparatus is used for alloying a zinc-coated ferrous strip, the coated strip is heated to substantially the temperature required for alloying, by passing the same through the plurality of transformers, and the radiation detector devices and cooling means control the alloying temperature and maintain the same for a sufficient period of time to complete the alloying process.

In the foregoing description, certain terms have been used for brevity, clearances and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

We claim:

1. In apparatus for heating a metal strip, means for passing the strip continuously through said apparatus, first and second contact means for electrical contact with said strip at points spaced from one another in the direction of strip travel and defining a resistance heating section of said strip, a plurality of transformer means each including a core providing a closed magnetic path around the strip and within said resistance heating section and having a primary coil on each of two opposite legs of the core and on opposite sides of the strip for producing voltages in series and in phase in said strip, a return conductor connecting said first and second contact means for completing a circuit through said reisstance heating section, means for supplying power to the primary coils of said transformers, and control means responsive to the temperature of said strip at a point in said resistance heating section for varying the voltage applied to said primary coils.

2. In apparatus for heating a metal strip, means for passing the strip continuously through said apparatus, first and second contact means for electrical contact with said strip at points spaced from one another in the direction of strip travel and defining a resistance heating section of said strip, a plurality of transformer means each including a core providing a closed magnetic path around the strip and within said resistance heating section and having a primary coil on each of two opposite legs of the core and on opposite sides of the strip for producing voltages in series and in phase in said strip, a return conductor connecting said first and second contact means for completing a circuit through said resistance heating section, means for supplying power to the primary coils of said transformers, strip cooling means located between said transformer means and said second contact means, and control means responsive to the temperature of said strip at a point in said resistance heating section between said transformer means and said cooling means for varying the voltage applied to said primary coils.

3. In apparatus for heating a metal strip, means for passing the strip continuously through said apparatus, first and second contact means for electrical contact with said strip at points spaced from one another in the direction of strip travel and defining a resistance heating section of said strip, a plurality of transformer means each including a core providing a closed magnetic path around the strip and within said resistance heating section and having a primary coil on each of two opposite legs of the core and on opposite sides of the strip for producing voltages in series and in phase in said strip, a return conductor connecting said first and second contact means for completing a circuit through said resistance heating section, means for supplying power to the primary coils of said transformers, strip convection cooling means located between said transformer means and said second contact means, and control means responsive to the temperature of said strip at a point in said resistance heating section between said convection cooling means and said second contact means for varying the voltage applied to said primary coils.

4. In apparatus for heating a metal strip, means for passing the strip continuously through said apparatus, first and second contact means for electrical contact with said strip at points spaced from one another in the direction of strip travel and defining a resistance heating section of said strip, a plurality of transformer means each including a core providing a closed magnetic path around the strip and within said resistance heating section and having a primary coil on each of two opposite legs of the core and on opposite sides of the strip for producing voltages in series and in phase in said strip, a return conductor connecting said first and second contact means for completing a circuit through said resistance heating section, means for supplying power to the primary coils of said transformers, and control means including first and second elements responsive to temperatures at first and second points on the strip spaced in the direction of strip travel, said first element acting to increase the power input to the transformers when the temperature at the first point is lower than a predetermined temperature, and said second element acting to reduce the power input when the temperature at the second point is higher than a predetermined temperature.

5. In apparatus for heating a zinc-coated ferrous metal strip, a zinc pot containing a bath of molten zinc, means for passing the strip continuously through the molten zinc, a roll for making electrical contact with said strip at a point spaced from said zinc bath in the direction of strip travel and defining with said zinc bath a resistance heating section of the strip, a plurality of transformer means each including a core providing a closed magnetic path around the strip and within said resistance heating section and having a primary coil on each of two opposite legs of the core and on opposite sides of the strip for producing voltages in series and in phase in said strip, and a return conductor connected to said roll and to said zinc pot for completing a circuit through said resistance heating section.

6. In apparatus for heating a zinc-coated ferrous metal strip, a zinc pot containing bath of molten zinc, means for passing the strip continuously through the molten zinc, a roll for making electrical contact with said strip at a point spaced from said zinc bath in the direction of strip travel and defining with said zinc bath a resistance heating section of the strip, a plurality of transformer means each including a core providing a closed magnetic path around the strip and within said resistance heating section and having a primary coil on each of two opposite legs of the core and on opposite sides of the strip for producing voltages in series and in phase in said strip, a return conductor connected to said roll and to said zinc pot for completing a circuit through said resistance heating section, means for supplying power to the primary coils of said transformers, and control means including first and second elements responsive to temperatures at first and second points on the strip spaced in the direction of strip travel, said first element acting to increase the power input to the transformers when the temperature at the first point is lower than a predetermined temperature, and said second element acting to reduce the power input when the temperature at the second point is higher than a predetermined temperature.

7. In apparatus for heating a zinc-coated ferrous metal strip, a zinc pot containing a bath of molten zinc, means for passing the strip continuously through the molten zinc, a roll for making electrical contact with said strip at a point spaced from said zinc bath in the direction of strip travel and defining with said zinc bath a resistance heating section of the strip, a plurality of transformer means each including a core providing a closed magnetic path around the strip and within said resistance heating section and having a primary coil on each of two opposite legs of the core and on opposite sides of the strip for producing voltages in series and in phase in said strip, an insulation enclosure within said transformer means defining a passage for the strip, and a return conductor connected to said roll and to said zinc pot for completing a circuit through said resistance heating section.

8. In apparatus for heating a metal strip, means for passing the strip continuously through said apparatus, first and second contact means for electrical contact with said strip located at points spaced from one another in the direction of strip travel and defining a resistance heating section in said strip, a plurality of transformer means inductively coupled to said strip within said resistance heating section for producing voltages in series in said strip, a return conductor connecting said first and second contact means, means for supplying power to the primary coils of said transformers and for causing liberation of heat throughout said resistance heating section at a rate sufficient to heat the strip to a predetermined temperature at a point in the strip travel relatively distant from said second contact means, and regulable convection cooling means between said point and said second contact means, whereby further increase of strip temperature beyond said predetermined temperature may be prevented.

9. In apparatus for heating a metal strip, means for passing the strip continuously through said apparatus, first and second contact means for electrical contact with said strip located at points spaced from one another in the direction of strip travel and defining a resistance heating section in said strip, a plurality of transformer means inductively coupled to said strip within said resistance heating section for producing voltages in series in said strip, a return conductor connecting said first and second contact means, means for supplying power to the primary coils of said transformers and for causing liberation of heat throughout said resistance heating section at a rate sufficient to heat the strip to a predetermined temperature at a point in the strip travel relatively distant from said second contact means, first cooling means for preventing increase of strip temperature, control means responsive to the temperature of said strip at a point in said resistance heating section for varying the voltage applied to said primary coils, and second cooling means for reducing the strip temperature, said first cooling means, control means and second cooling means being located in sequence following the point at which desired temperature in the strip is reached.

10. In a thermal treatment process for a metal strip, the steps of passing the strip continuously through a treatment zone defined by first and second electrical contacts spaced from each other in the direction of strip travel, causing current to flow through a circuit including the strip, the first and second contacts and a return conductor between the contacts, by inducing a potential gradient longitudinally of the strip and of sufficient intensity to increase the strip temperature to a desired value at a point intermediate said first and second contacts, shielding the strip from cooling between said first contact and said point at which desired temperature is reached, and applying regulable cooling between said point and said second contact to remove heat from the strip at a rate substantially as great as the rate of heat liberation, thereby maintaining the temperature of the strip without substantial increase at the desired temperature regardless of heat liberated therein, after such desired temperature is reached.

11. A thermal treatment process for a metal strip as defined in claim 10, in which the potential gradient is induced longitudinally of the strip by passing the strip longitudinally through a series of transformers.

12. A thermal treatment process for a metal strip as defined in claim 11, in which the voltage applied to the primary coils of the transformer is varied in accordance with the temperature of the strip at a point in said treatment zone.

13. In apparatus for heating a zinc-coated ferrous metal strip to produce a zinc-iron alloy coating thereon, a zinc pot containing a bath of molten zinc, means for passing the strip continuously through the molten zinc, a roll for making electrical contact with said strip at a point spaced from said zinc bath in the direction of strip travel and defining with said zinc bath a resistance heating section of the strip, transformer means within said resistance heating section comprising a plurality of cores providing closed magnetic paths around the strip and primary coils on said cores for producing voltages in series and in phase in said strip, a return conductor connected to said roll and to said zinc pot for completing a circuit through said resistance heating section, means for supplying power to the primary coils of said transformer means, and means controlling alloying of the ferrous metal and zinc, said alloying control means including first and second radiation detector elements responsive to emissivity at first and second points on the strip spaced in the direction of strip travel, said first element acting to decrease the power input to the transformer when zinc-iron alloying has been completed at said first point, and said second element acting to increase the power input to the transformer means when zinc-iron alloying is incomplete at said second point.

14. In apparatus for heating a zinc-coated ferrous metal strip to produce a zinc-iron alloy coating thereon as defined in claim 13, convection cooling means located between said transformer means and said alloying control means.

15. In apparatus for heating a zinc-coated ferrous metal strip to produce a zinc-iron alloy coating thereon as defined in claim 13, forced cooling means located between said alloying control means and said contact roll.

16. In apparatus for heating a zinc-coated ferrous metal strip to produce a zinc-iron alloy coating thereon as defined in claim 14, forced cooling means located between said alloying control means and said contact roll.

17. In apparatus for heating metal strip, means for passing the strip continuously through said apparatus, first and second contact means for electrical contact with said strip at points spaced from one another in the direction of strip travel and defining a resistance heating section of said strip, a plurality of transformer means each including a core providing a closed magnetic path around said strip, and primary coils on said cores for producing voltages in series and in phase in said strip, and a return conductor connecting said first and second contact means for completing a circuit through said resistance heating section.

References Cited in the file of this patent

UNITED STATES PATENTS

| | | |
|---|---|---|
| 1,765,520 | Adams | June 24, 1930 |
| 1,930,601 | Townsend | Oct. 17, 1933 |
| 2,417,030 | Wilson et al. | Mar. 4, 1947 |
| 2,448,008 | Baker | Aug. 31, 1948 |
| 2,502,770 | Watson | Apr. 4, 1950 |
| 2,583,227 | Neidigh | Jan. 22, 1952 |
| 2,590,850 | Dungler | Apr. 1, 1952 |
| 2,773,161 | Baker | Dec. 4, 1956 |
| 2,876,335 | Rendel | Mar. 3, 1959 |